Jan. 15, 1963 C. B. HENDERSON ETAL 3,073,120
IGNITER MEANS FOR EXTRUDED PLASTIC MONOPROPELLANT
Filed Feb. 5, 1959
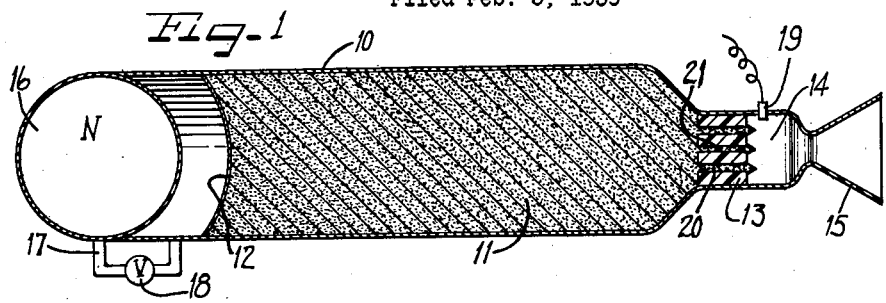
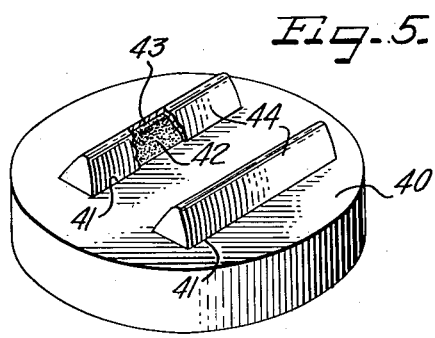
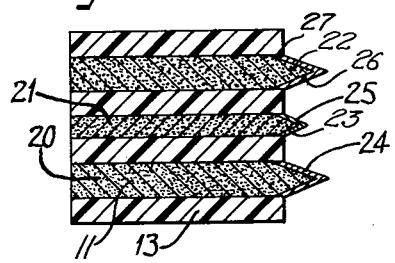
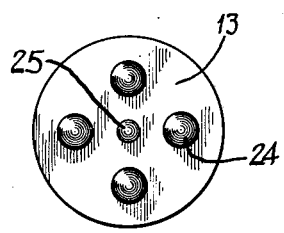
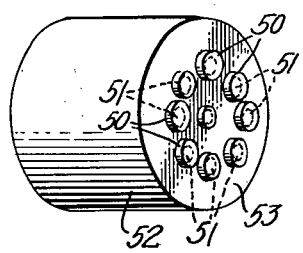
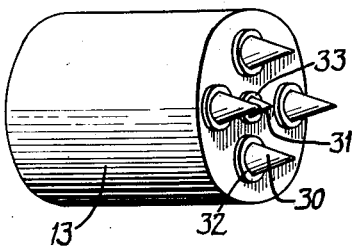
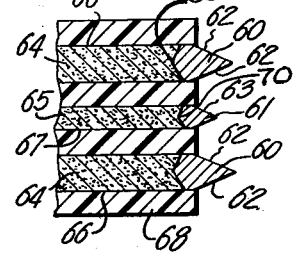
Inventors
Charles B. Henderson
and Joe M. Burton
By Martha L. Ross
AGENT

United States Patent Office 3,073,120
Patented Jan. 15, 1963

3,073,120
IGNITER MEANS FOR EXTRUDED PLASTIC MONOPROPELLANT
Charles B. Henderson, Alexandria, and Joe M. Burton, Springfield, Va., assignors to Atlantic Research Corporation, Alexandria, Va., a corporation of Virginia
Filed Feb. 5, 1959, Ser. No. 791,492
11 Claims. (Cl. 60—39.47)

This invention relates to a method and device for shaping and igniting the leading face of a column or mass of plastic monopropellant extruding into the combustion chamber of a gas generating apparatus, such as a rocket motor or gas turbine. More particularly, this invention relates to a shaped igniter of solid propellant superimposed on the leading face of the plastic monopropellant prior to ignition.

The term monopropellant refers to a composition which is substantially self-sufficient with regard to its oxidant requirements as distinguished from bipropellants where the fuel is maintained separately from the oxidizer source until admixture at the point of combustion.

There have recently been developed for use in gas generating apparatus, such as rocket motors, gas turbines and the like, a number of plastic monopropellants, which are particularly adapted for extrusion as cohesive, shape-retaining, continuously advancing masses or columns into a combustion chamber, where they are burned to generate high energy gases for developing thrust or power or for providing heat or gas pressure. The compositions have thixotropic properties and are sufficiently fluid above a certain finite stress to be fed at ambient temperatures through shaping apertures into a combustion chamber. The leading face of the shape-retaining column presents a burning surface of predeterminable area, which can be varied and controlled by varying the rate of extrusion. These plastic monopropellants combine many of the advantages and eliminate many of the disadvantages of previously known liquid or solid propellants used to power similar devices.

Such plastic monopropellants are normally stored in a fuel tank from which they are extruded through an apertured plate or other suitable extrusion member into a combustion chamber. The primary purpose of the extrusion member is to divide the propellant into a plurality of separate masses or columns, thereby to increase the total burning area of monopropellant available in a combustion chamber, of preferably minimum length.

When burning equilibrium is reached at a given rate of extrusion which should be higher than the linear burning rate of the monopropellant, the extruding column of monopropellant burns on all surfaces exposed in the combustion chamber and these surfaces converge in the downstream direction forming a downstream edge or apex, depending on the shape of the extrusion orifice. The angle of convergence at equilibrium is a constant determined by the linear burning rate of the particular monopropellant and the linear rate of extrusion, regardless of the size of the extrusion aperture. The angle of convergence at equilibrium is determined only by the ratio of the linear rate of extrusion to the linear burning rate of the particular monopropellant, regardless of the size of the extrusion aperture. The higher the value of this ratio, the more acute is the downstream angle of convergence, resulting in a longer column of burning propellant having a proportionately larger burning surface area. The mass rate of burning is proportional to the burning surface area and the linear burning rate. Consequently, the linear rate of extrusion is at equilibrium the determinative factor for the mass rate of burning.

Prior to ignition, the plastic monopropellant is ordinarily extruded from the fuel tank into the extrusion member sufficiently completely to fill the extrusion passages and orifices and to protrude into the combustion chamber for a short distance beyond the downstream end of the orifice, the length of protruding column being predetermined by such factors as the linear burning rate of the particular monopropellant composition, the desired equilibrium burning surface area, the linear rate of extrusion during burning, the desired start-up pressure-time characteristics, and the change in mass rate of gas-generation and, thereby pressure, as the initially ignited burning surface approaches the equilibrium burning surface.

The protruding portion of the monopropellant mass or column, prior to ignition, will have a cross-sectional geometry similar to that of the extrusion orifice, which functions, in effect, as a shaping orifice, and a plane-surfaced leading face. The plane-surfaced protruding column can be ignited by conventional methods, such as a hot wire igniter, a squib, or the like. Ignition generally occurs first on the leading plane surface followed by ignition of the sides of the monopropellant column exposed in the combustion chamber. In some cases ignition of the sides may not occur until combustion chamber temperature and pressure have reached a relatively high value. There is also the possibility, in some instances, that the flame will not propagate down the sides before the length of the column, which, while burning on its plane surface at the linear burning rate of the monopropellant, is being extruded at a higher rate, becomes so excessive as to result in slumping, fragmentation, or even protrusion out through the gas venting nozzle. After burning propagates down the sides, the surfaces converge in the downstream direction, as aforedescribed, eventually producing the equilibrium burning surface. In many applications, it is desirable for smooth performance to achieve the equilibrium mass rate of gas generation and combustion chamber pressure as quickly as possible, so that the marked hiatus between ignition of the plane-surfaced monopropellant column and formation of the equilibrium burning surface is disadvantageous. To some extent, this can be counter-balanced by careful presetting of the initial degree of protrusion of the monopropellant into the combustion chamber prior to ignition and very closely regulated initial extrusion rate. However, this requires exceedingly fine and critical prescheduling and manipulation. There is the likelihood that equilibrium combustion chamber pressures will be reached too slowly or may go through a transient overshoot. In some cases, one or the other of these conditions may be desirable, but here again, the fine manipulation required to obtain the exactly desired programming is exceedingly difficult to achieve when the initial ignition surface of the plastic monopropellant is plane.

The object of this invention is to provide as an igniter for the plastic monopropellant, a body of solid propellant adapted to overlie the leading face of the monopropellant column.

Another object is to provide as an igniter for the plastic monopropellant, a die of solid propellant so shaped or recessed that it can also preshape the leading face of the plastic monopropellant column substantially to its equilibrium burning surface configuration prior to ignition or to downstream convergent contours approaching the equilibrium burning surface.

Still another object is to provide a solid propellant igniter die which ensures immediate ignition of the lateral surface of the plastic monopropellant column exposed in the combustion chamber.

It is a further object to provide such an internally shaped igniter die of solid propellant which is also exteriorly shaped to provide the desired initial mass rate of gas generation and build-up of combustion chamber pressure.

A further object is to provide a shaped igniter of solid propellant adapted to overlie the leading face of the monopropellant column and having a shaped downstream convergent contour approaching or substantially the same as that of the plastic monopropellant at equilibrium.

Another object is to provide a solid propellant igniter closure which functions as a seal at the exit of the extrusion passage into the combustion chamber to prevent premature leakage of the plastic monopropellant into the combustion chamber during ground handling, vibrational or accelerative stresses prior to ignition.

A still further object is to provide a solid propellant closure which functions as a vapor seal for hygroscopic plastic monopropellants.

Other objects, features, and advantages of the present invention will be more fully apparent to those skilled in the art from the following detailed description taken in connection with the accompanying drawing in which like reference characters refer to like parts throughout and wherein:

FIGURE 1 is a diagrammatic sectional view of a rocket engine of the type in which the present invention finds application.

FIGURE 2 is a longitudinal sectional view of a fuel extrusion member showing the solid propellant dies inserted in the passages thereof.

FIGURE 3 is an end elevational view of the extrusion member shown in FIGURE 2.

FIGURE 4 is an isometric view of an alternative embodiment of the invention.

FIGURE 5 is an isometric view of a different embodiment of the invention with a portion of the igniter die cut away.

FIGURE 6 is an isometric view of still a different embodiment.

FIGURE 7 is a longitudinal sectional view of still another modification.

Broadly speaking, the invention comprises an igniter body made of readily ignitible solid propellant, which can be mounted over or just within the downstream end of the plastic monopropellant extrusion passage or orifice, so that its base is in intimate contact with the leading face of the plastic monopropellant column in overlying relationship when the latter is extruded up into the passage. Thus the solid propellant body functions effectively as an igniter for the plastic monopropellant and can also serve as a protective closure.

Preferably, also, the solid igniter is contoured to provide prior to ignition, an equilibrium burning surface or a surface having a downstream convergent contour approaching the equilibrium burning shape. This can be accomplished either by forming the solid propellant into a die which molds the leading face of the plastic propellant into the desired configuration, by contouring the downstream face of the solid igniter to the desired convergent shape, or by a combination of both these expedients.

The solid igniter, when employed as a die, is interiorly recessed and shaped in such manner that the leading end of the column of extruded plastic monopropellant can be received therein and shaped to downstream convergent contours approaching the shape of its equilibrium burning surface and, preferably substantially to its desired equilibrium burning surface configuration. The solid propellant die is ignited first on its exterior or downstream surface and after burning through to its interior or upstream surface, in turn, ignites the leading face of the plastic propellant, which is already shaped for equilibrium burning or to contour approaching equilibrium burning. Thus the initial burning surface of the plastic propellant can be predesigned and preset simply and effectively, thereby eliminating the need for preliminary, difficult extrusion adjustments, and the problems incident to ignition of an initial plane surface. Furthermore, the close contact of the entire initial shaped plastic monopropellant burning surface with the solid propellant igniter ensures immediate ignition of the entire area including the desired upstream burning portion.

Although the most rapid establishment of equilibrium burning is obtained by shaping the leading face of the plastic propellant initially to its equilibrium burning surface by means of the igniter die, any contouring to a downstream convergent configuration increases the rapidity with which equilibrium is established and, by ensuring immediate lateral or upstream ignition, eliminates any possibility that burning will continue on the initially ignited leading plane surface for an excessive period of time before propagation along the upstream sides. It will be understood, therefore, that although the following discussion will, in general, refer to the optimum equilibrium burning shaping, any downstream convergent preshaping by the igniter die is highly advantageous and is encompassed within the scope of this invention.

The size and interior geometry of the solid propellant die is, of course, predesigned to shape and to accommodate an equilibrium burning surface of the requisite size and geometry for the particular application, this being determined by such factors as the linear burning rate of the monopropellant, the rate of extrusion, and the cross-sectional geometry of the extrusion passage.

The exterior or downstream surface and the web thickness of the solid propellant igniter die can also be predesigned and presized to provide the desired initial pressure-time characteristics. The mass burning rate of the solid propellant (as well as of the plastic propellant) is the product of propellant density, burning surface area, and linear burning rate, the latter being, in turn, a function of both the burning characteristics of the particular propellant and the combustion chamber pressure, there being generally an increase with increase in pressure. The mass burning rate, together with certain other thermodynamic properties of the propellant, such as moles of gas produced per unit weight and flame temperature, determines the volumetric rate of gas generation, which, in turn, both determines and is a variable function of combustion chamber pressure. For example, upon initiation of burning in a combustion chamber at ambient temperature and pressure with a given propellant, assuming an igniter die configuration providing a constant area of the regenerating burning surface and an exhaust nozzle of fixed size, the gases generated will cause a build-up of pressure and the increasing pressure will increase the linear burning rate of the propellant. The mass rate of gas generation will thus increase with increasing pressure until, and if, the scheduled equilibrium pressure is reached prior to complete consumption of the die. A web geometry which provides progressively larger burning surface area as burning continues produces a more rapidly increasing mass rate of gas generation and combustion chamber pressure than a web of the same size designed to produce a constant area of burning surface as burning progresses. A regressive burning surface area can be used to produce a less rapid increase in the mass rate of gas generation and combustion chamber pressure. Thus, by proper selection of the solid propellant for its linear burning rate and other thermodynamic properties and by properly proportionating the initial burning surface area and web configuration of the solid propellant igniter die to the burning characteristics of the propellant composition, the combustion chamber start-up pressure versus time characteristics can be adequately predesigned. Such selection and design for any given application can readily be made and calculated by those skilled in the art.

In some cases, a slow build-up to equilibrium pressure or a low initial take-off thrust may be desired. In other applications a very rapid build-up to equilibrium pressure or even an initially higher thrust or boost may be the objective. These can readily be preprogrammed, as aforedescribed, by proper selection of solid propellant composition and initial burning surface and web geometry of the igniter die.

Instead of preshaping the plastic monopropellant to its equilibrium burning surface configuration, the solid igniter itself can provide the surface assumed by the plastic monopropellant at equilibrium burning or a downstream convergent contour approaching that at equilibrium burning, by suitable preshaping of the downstream surface of the igniter body. With such a configuration of the solid igniter, a shaping recess can be dispensed with if the linear burning rate of the solid propellant and its response to increasing pressure is the same as or not substantially different from these characteristics of the plastic monopropellant.

Under such conditions, the shaped solid igniter, when overlying the leading face of the plastic monopropellant column in intimate contact, becomes, in effect, merely an extension of the plastic propellant and provides the desired burning surface. After ignition of the contoured downstream surface of the solid igniter, with simultaneous initiation of extrusion of the plastic column into the combustion chamber at the scheduled rate, the burning surface, which is immediately at or rapidly achieves equilibrium at the given extrusion rate, regenerates up the extruding column, reaches first the sides of the plastic propellant adjacent the periphery of the base of the solid igniter, is composed, for a shorft interval of both solid and plastic propellant, and, after the solid propellant is completely consumed continues to regenerate at equilibrium entirely on the extruding plastic monopropellant column.

The base of the solid propellant igniter having its downstream face contoured for equilibrium burning, preferably has the same cross-sectional area and geometry as the extrusion orifice, although some latitude in these respects is quite feasible in some applications. When the base has the same size and geometry as the orifice or is somewhat larger, the igniter can also function as a closure. It can, for example, be sealably mounted prior to ignition use just within the downstream mouth of the orifice or over the downstream end of the orifice. To prevent its being jarred loose, the igniter can be adhered at its base to the walls of the orifice or the downstream face of the extrusion plate adjacent to the orifice. It can also, if desired, be sealably mounted in a collar circumscribing the downstream end of the extrusion orifice. The seal immobilizing the igniter should be relatively weak so that it can be broken under the stress of the extrusion begun at ignition.

The base or upstream face of the shaped igniter can be plane, in conformity with the plane surface of the leading face of the initially unshaped, plastic propellant column extruded through the extrusion orifice, but preferably it is provided with prongs or upstream protrusions which ensure more intimate contact with the plastic monopropellant.

Although the downstream face of the igniter shaped to equilibrium surface may not as easily be scheduled to desired initial pressure build-up versus time characteristics as a recesed igniter die, it does have practical advantages in terms of ease of manufacture and the elimination of special precautions to avoid the occlusion of air bubbles.

In some cases, the scheduling of a downstream equilibrium or an approaching equilibrium surface of the solid propellant igniter can be combined with an internal shaping recess. This might be desirable, for example, where the solid propellant has, preferably, for a particular application, a substantially different burning rate from that of the plastic propellant.

The plastic monopropellants, though cohesive and shape-retentive, will flow under stress. The solid propellant igniters, therefore, where they also cap or seal the extrusion orifices, serve the advantageous function of preventing premature leakage of the plastic composition into the combustion chamber under stresses incident to handling or transportation. Some of the plastic monopropellants compositions tend to be hygroscopic, namely to absorb atmospheric moisture which may adversely affect their viscosity and burning properties. The solid propellant igniter closures also function as effective vapor seals protecting the plastic monopropellant from atmospheric moisture.

It should be noted that, although preferably the solid propellant igniter also provides a shaped equilibrium burning surface either per se or by molding the surface of the plastic monopropellant, it is also highly advantageous solely as a combined ignition device and closure. These functions can effectively be performed by means, for example, of a wafer of solid propellant of adequate size to seal the extrusion orifice either by insertion into its downstream mouth or by overlying it. In such case the plastic monopropellant, prior to ignition, is extruded into the extrusion orifice until its leading, plane surface is in contact with the flat igniter closure. After ignition, the burning solid igniter then serves uniformly to ignite the plane surface of the plastic propellant.

Turning now to the drawings and in particular to FIGURE 1 thereof, there is shown a diagrammatic longitudinal sectional view of a rocket engine of the type which by way of example, is adapted to use the method and device of the present invention. This rocket engine consists of a fuel tank 10 which may be of generally cylindrical shape and which is adapted to contain a plastic monopropellant 11. Slidably mounted in the forward end of the fuel tank 10 is an extrusion piston 12 which extrudes the monopropellant 11 through an extrusion member 13 into a combustion chamber 14. A nozzle 15 is in open communication with the combustion chamber 14 to receive the gases generated therein and discharge them to produce thrust. The piston 12 is actuated to extrude the monopropellant 11 by pressurized gas, such as nitrogen, admitted from a tank 16 forming the front wall of fuel tank 10 through a conduit 17 having a valve 18 therein to the forward portion of fuel tank 10 forward of piston 12. The setting, either manual or automatic, of valve 18 may be varied to control the pressure of gas applied to piston 12 and hence to control the extrusion rate of the monopropellant 11 to a desired value. A conventional igniter 19 is provided in the combustion chamber 14. Igniter 19, may, for example, be of the squib type, namely a small propellant or explosive charge, or it may be any suitable electrically actuated igniter.

FIGURE 2 shows the cone-shaped equilibrium burning surface configuration 22 and 23 of plastic monopropellant 11 when it is extruded through circular orifice passages 20 and 21. Cones of solid propellant 24 and 25 are recessed interiorly to provide shaping contours conforming to the desired equilibrium burning surface of the plastic monopropellant, including a maximum internal diameter equal to the maximum cross-sectional diameter of the orifice. The external uninhibited surface of the igniter cone, in this case, has the same shape and size as the interior surface and, therefore, has the same equilibrium burning surface area as the leading face of plastic monopropellant. Face 27 of the igniter cone is inhibited either by a cementing adhesive or by intimate contact with the orifice wall and does not provide a burning surface. Web 26 of the cone of solid propellant is of uniform thickness so that the burning surface area of solid propellant remains constant as the flame generates from the exterior to the interior of the cone.

The bases of conical cones 24 and 25, in this embodiment, are inserted into the downstream ends of the extrusion passages and secured to the walls of the passages in any suitable manner, as by cementing.

In practice, the plastic monopropellant 11 can be forced under pressure from piston 12 (or other equivalent extruding means) into extrusion passages 20 and 21 and into the hollow solid propellant cones 24 and 25 where the leading faces of the plastic propellant masses are shaped or molded into their equilibrium burning surface configurations, or the die can be positioned in molding contact after the column has been sufficiently extruded up into the orifice passage. This extrusion molding phase can be done at any time prior to ignition. At the time of firing, the igniter 19 is actuated to ignite the cones of solid propellant. The flame generates on each cone from the exterior or downstream surface through to the interior surface, where it comes in contact with the entire, shaped, equilibrium surface of the plastic monopropellant and, thereby, effectively serves uniformly to ignite the plastic monopropellant. Extrusion of the plastic monopropellant is synchronized with ignition and continues at the scheduled rate to provide for the desired mass rate of gas generation by the burning, extruding columns of plastic monopropellant in the combustion chamber.

The desired initial pressure versus time curve prior to ignition of the plastic monopropellant can be pre-programmed with cone-shaped igniter dies, as shown in FIGURES 2 and 3, by selection of a solid propellant having suitable burning properties, e.g. in terms of linear burning rate, pressure exponent (the exponent of pressure that permits proportionality of combusition chamber pressure to linear burning rate), and mols of gas produced per unit weight, and by varying the web thickness.

FIGURE 4 illustrates an embodiment which is substantially similar to that of FIGURES 3 and 4 except that the cone shaped igniter dies 30 and 31, instead of being attached to the inside of the extrusion orifices, are provided with annular flanges 32 and 33, which can be cemented to the downstream face of the extrusion member exposed in the combustion chamber. As in the case of the cones shown in FIGURES 2 and 3, the interior recesses of the cones of FIGURE 4 contour the leading face of the unignited plastic monopropellant to its equilibrium shape and have a maximum cross-section diameter equal equal to the interior diameter of the extrusion orifice. Flanges 32 and 33 can be made of the solid propellant composition comprising the igniter cone. If this additional ignitible propellant interferes with the desired scheduled mass burning characteristics, the flanges can be made of a non-propellant material, such as an inert solid polymer free from oxidizer and attached to the igniter cone in any suitable manner, as by cementing.

It will be understood that the size, e.g. height and cross-sectional area, and the shape of the equilibrium burning surface of the extruding plastic monopropellant column or mass is largely determined by the rate of extrusion, by the burning rate of the particular monopropellant, and by the size and shape of the extrusion orifices. The igniter die is, therefore, preshaped and presized to particular conditions.

FIGURE 5 shows an extrusion member or plate 40 provided with rectangular oblong extrusion orifices 41 and the equilibrium burning shape of the extruding strip of monopropellant 42, the surfaces of which converge downstream to form a leading edge 43. The igniter die 44 of solid propellant, as shown, is shaped accordingly to mold the leading face of the plastic monopropellant prior to ignition to its equilibrium burning surface contours.

FIGURE 6 illustrates an embodiment in which the solid propellant igniters are in the form of flat discs 50 overlying and sealing extrusion orifices 51 at their downstream ends in extrusion member 52. The igniter discs are cemented peripherally to the downstream face 53 of the extrusion plate. In this, the solid propellant discs function as igniters and sealing closures.

FIGURE 7 shown unrecessed igniter cones 60 and 61 provided with downstream convergent faces 62 and 63 shaped to equilibrium burning contour and overlying the leading faces of plastic monopropellant columns 64 and 65 at the downstream ends of extrusion passages 66 and 67 in extrusion plate 68. The bases of the igniter cones are provided with conical upstream protrusions 69 and 70, which are inserted into the ends of the columns to improve contact efficiency. The igniter cone is sealably attached just within the mouth of the orifice.

The solid propellant compositions employed in making the igniters can be any suitable one known in the art which is readily ignited. It can, for example, be one of the conventional double-base propellants, e.g. nitrocellulose gelatinized with nitroglycerine, or a composite type propellant comprising a solid inert fuel, e.g. an inert solid polymer, such as polyvinyl chloride or cellulose acetate, preferably plasticized with a nonvolatile plasticizer to reduce brittleness, containing dispersed therein a solid oxidizer, such as ammonium perchlorate or nitrate. Many such solid propellants having the different burning properties required for different applications are available for selection by those skilled in the art.

The monopropellant employed in the devices of this invention is preferably a plastic mass which is sufficiently cohesive to retain a shaped form and which is extrudable under pressure at ambient temperatures. Many different plastic monopropellant compositions tailored to different performance requirements can be made having these desired physical characteristics. The monopropellant compositions generally preferably comprise a stable dispersion of a finely-divided, insoluble solid oxidizer in a continuous matrix of an oxidizable liquid fuel.

The liquid fuel can be any oxidizable liquid, preferably an organic liquid containing carbon and hydrogen. Suitable liquid fuels include hydrocarbons, such as triethyl benzene, dodecane, liquid polyisobutylene, and the like; compounds containing oxygen linked to a carbon atom, as, for example, esters, like dimethyl maleate, diethyl phthalate, dibutyl oxalate, and the like; alcohols, such as benzyl alcohol, triethylene glycol and the like; ethers such as methyl α-naphthyl ether and the like; and many others.

The solid oxidizer can be any suitable, active oxidizing agent which yields an oxidizing element such as oxygen, chlorine or fluorine readily for combustion of the fuel and which is insoluble in the liquid fuel vehicle. Such oxidizers include inorganic oxidizing salts such as ammonium, sodium and potassium perchlorate or nitrate and metal peroxides such as barium peroxide.

The amount of solid oxidizer incorporated varies, of course, with the particular kind and concentration of fuel components in the formulation, the particular oxidizer, and the specific requirements for a given use, in terms, for example, of required heat release and rate of gas generation, and can readily be computed by those skilled in the art. Since the liquid vehicle can, in many instances, be loaded with as high as 80 to 90% of finely-divided solids, stoichiometric oxidizer levels with respect to the fuel components can generally be achieved when desired, as for example, in rocket applications where maximum heat release and specific impulse are of prime importance. In some applications, stoichiometric oxidation levels may not be necessary or even desirable, as, for example, in gas turbines where relatively low combustion chamber temperatures are preferred, and the amount of oxidizer can be correspondingly reduced. Sufficient oxidizer must, of course, be incorporated to maintain active, gas-generating combustion.

Finely-divided solid metal powders such as aluminum or magnesium, may be incorporated in the monopropellant composition as an additional fuel component along with the liquid fuel. Such metal powders possess the advantages both of increasing the fuel density and improving the specific impulse of the monopropellant because of their high heats of combustion.

The physical properties of the plastic monopropellant in terms of shape-retentive cohesiveness, tensile strength and thixotrophy, can be improved by addition of a gelling agent, such as a polymer, e.g. polyvinyl chloride, polyvinyl acetate, cellulose acetate, ethyl cellulose, or metal salts of higher fatty acids, such as the sodium or magnesium stearates or palmitates. The desired physical properties can also be obtained without a gelling agent by using a liquid vehicle of substantial intrinsic viscosity, such as liquid organic polymers, e.g. liquid polyisobutylene, liquid siloxanes, liquid polyesters, and the like.

Many different plastic monopropellant compositions may also be used. It is, therefore, to be understood that this invention is not limited to use with any particular plastic monopropellant composition, but is directed to the shaping and ignition of any extruded plastic monopropellant.

Although this invention has been described with reference to illustrative embodiments thereof, it will be apparent to those skilled in the art that the principles of this invention can be embodied in other forms but within the scope of the claims.

We claim:

1. In a gas generating apparatus wherein a plastic monopropellant, which is fluid under stress at ambient temperatures, is extruded from a fuel chamber through an orifice in an apertured member into a combustion chamber in the form of a shape-retentive, continuously extruding column, the leading face of which is burned in said combustion chamber to generate gases, the improvement comprising an igniter body of solid propellant mounted adjacent to the downstream end of said orifice and contacting, prior to ignition, the leading face of said monopropellant column in overlying relationship thereto at a position downstream from the upstream end of said orifice, said igniter having at least one face of downstream-converging contour.

2. In a gas generating apparatus wherein a plastic monopropellant, which is fluid under stress at ambient temperatures, is extruded from a fuel chamber through an orifice in an apertured member into a combustion chamber in the form of a shape-retentive, continuously extending column, the leading face of which is burned in said combustion chamber to generate gases, the improvement comprising an igniter body of solid propellant sealingly mounted adjacent to the downstream end of said orifice and contacting, prior to ignition, the leading face of said monopropellant column in overlying relationship thereto at a position downstream afrom the upstream end of said orifice, said igniter having at least one face of downstream-converging contour.

3. In a gas generating apparatus wherein a plastic monopropellant, which is fluid under stress at ambient temperatures, is extruded from a fuel chamber through an orifice in an apertured member into a combustion chamber in the form of a shape-retentive, continuously extruding column, the leading face of which is burned in said combustion chamber to generate gases, the improvement comprising an igniter die of solid propellant mounted adjacent to the downstream end of said orifice and contacting, prior to ignition, the leading face of said monopropellant column in overlying relationship thereto at a position downstream from the upstream end of said orifice, said igniter die having a shaping recess for shaping said leading face of said plastic monopropellant into downstream-converging contour.

4. In a gas generating apparatus wherein a plastic monopropellant, which is fluid under stress at ambient temperatures, is extruded from a fuel chamber through an orifice in an apertured member into a combustion chamber in the form of a shape-retentive, continuously extruding column, the leading face of which is burned in said combustion chamber to generate gases, the improvement comprising an igniter die of solid propellant sealingly mounted adjacent to the downstream end of said orifice and contacting, prior to ignition, the leading face of said monopropellant column in overlying relationship thereto at a position downstream from the upstream end of said orifice, said igniter die having a shaping recess for shaping said leading face of said plastic monopropelland into downstream-converging contour.

5. In a gas generating apparatus wherein a plastic monopropellant, which is fluid under stress at ambient temperatures, is extruded from a fuel chamber through an orifice in an apertured member into a combustion chamber in the form of a shape-retentive, continuously extruding column, the leading face of which is burned in said combustion chamber to generate gases, the improvement comprising an igniter die of solid propellant sealingly mounted adjacent to the downstream end of said orifice and contacting, prior to ignition, the leading face of said monopropellant column in overlying relationship thereto at a position downstream from the upstream end of said orifice, said igniter die having a downstream face of downstream converging contour and a shaping recess for shaping said leading face of said plastic monopropellant into downstream-converging contour.

6. In a gas generating apparatus wherein a plastic monopropellant, which is fluid under stress at ambient temperatures, is extruded from a fuel chamber through an orifice in an apertured member into a combustion chamber in the form of a shape-retentive, continuously extruding column, the leading face of which is burned in said combustion chamber to generate gases, the improvement comprising an igniter body of solid propellant having a substantially conical downstream face, said igniter being sealingly mounted adjacent to the downstream end of said orifice and contacting, prior to ignition, the leading face of said monopropellant column in overlying relationship thereto at a position downstream from the upstream end of said orifice.

7. The gas-generating apparatus of claim 6 in which the igniter body has an upstream face of substantially conical shape.

8. An igniter body made of solid propellant for use in a gas generating apparatus wherein a plastic monopropellant, which is fluid under stress at ambient temperatures, is extruded through an orifice into a combustion chamber in the form of a shape-retentive, extruding column, the leading face of which is burned in said combustion chamber to generate gases, said igniter body having a substantially conical exterior face and being adapted for being overlaid on the leading face of the plastic monopropellant column prior to ignition with said conical face in downstream position.

9. The igniter body of claim 8 which has, in addition, a recess shaped to contour the leading face of the plastic monopropellant column into downstream-convergent shape.

10. An igniter body made of solid propellant for use in a gas generating apparatus wherein a plastic monopropellant, which is fluid under stress at ambient temperatures, is extruded through an orifice into a combustion chamber in the form of a shape-retentive, extruding column, the leading face of which is burned in said combustion chamber to generate gases, said igniter body having a substantially wedge-shaped exterior face and being adapted to being overlaid on the leading face of the plastic monopropellant column prior to ignition with said wedge-shaped face in downstream position.

11. The igniter body of claim 10 which has, in addition, a recess shaped to contour the leading face of the plastic monopropellant column into downstream-convergent shape.

References Cited in the file of this patent

UNITED STATES PATENTS

| 2,627,160 | MacDonald | Feb. 3, 1953 |
| 2,681,619 | Chandler | June 22, 1954 |

FOREIGN PATENTS

| 582,621 | Great Britain | Nov. 22, 1946 |